United States Patent [19]

Allen et al.

[11] Patent Number: 5,102,632

[45] Date of Patent: Apr. 7, 1992

[54] TWO-STEP METHOD FOR RECOVERING DISPERSED NOBLE METALS

[75] Inventors: Robert J. Allen, Saugus; Peter C. Foller, Boston; James Giallombardo, Beverly, all of Mass.

[73] Assignee: Metallgesellschaft Aktiengesellschaft, Frankfurt am Main, Fed. Rep. of Germany

[21] Appl. No.: 632,160

[22] Filed: Dec. 21, 1990

[51] Int. Cl.⁵ .................. C01G 55/00; C22B 11/00; B01J 23/96
[52] U.S. Cl. ........................... 423/22; 75/632; 75/633; 502/35
[58] Field of Search .............. 423/22, 343, 463; 502/35; 75/631, 632, 633

[56] References Cited

U.S. PATENT DOCUMENTS

| | | | |
|---|---|---|---|
| 1,982,194 | 11/1934 | Brode et al. | 423/136 |
| 2,752,301 | 6/1956 | Cooper | 423/60 |
| 3,951,648 | 4/1976 | Sterm et al. | 502/35 |
| 4,960,573 | 10/1990 | Okutahi et al. | 423/22 |

FOREIGN PATENT DOCUMENTS

| | | | |
|---|---|---|---|
| 44998 | 4/1975 | Japan | 423/22 |
| 118999 | 9/1975 | Japan | 502/35 |
| 43060 | 11/1980 | Japan | 502/35 |

OTHER PUBLICATIONS

*A Comprehensive Treatise On Inorganic And Theoretical Chemistry* J. W. Mellor–Longmans Green and Co., New York–1947 vol. XV–pp. 573 and 660.

Primary Examiner—Paul E. Konopka
Attorney, Agent, or Firm—Herbert Dubno

[57] ABSTRACT

A two-stage method of recovering the noble metal content of a mixture of noble metals, for example, platinum, palladium, and rhodium, this mixture being, for example, comprises on or throughout a pellet or on or throughout a ceramic monolith of a spent catalyst, the method comprising first reductive chlorination at an elevated temperature by a gaseous chlorinating agent in the presence of a reducing agent (preferably the reducing agents sulfur dioxide and carbon monoxide in stages); minimizing the amount of aluminum trichloride formed from either washcoat or underlying ceramic chlorination, and separating the aluminum trichloride or other washcoat chlorides from the products of chlorination of the noble metals, as by sublimation of the former in a reducing atmosphere at a temperature below the vaporization temperatures of the latter, thereby recovering the noble metal chlorides in a concentrated form. As a second stage, temperature is further increased in an atmosphere of chlorine alone to volatilize rhodium trichloride for collection seperately from the palladium and platinum chlorides volatilized previously in the first-stage reductive chlorination.

18 Claims, 3 Drawing Sheets

TWO-STEP METHOD FOR RECOVERING DISPERSED NOBLE METALS

FIELD OF THE INVENTION

Our present invention relates to a method of recovering dispersed platinum group metals from typical catalytic compositions on ceramic support structures containing low concentrations of such metals. More particularly, the invention is directed to a method of recovering the platinum group metals platinum, palladium, and rhodium where they are deposited together or individually onto or admixed into high surface area alumina supports and, especially, for recovery of spent automotive catalysts, such as noble metal bearing cordierite or other ceramic honeycomb-type monoliths or pellets. In its most generic sense the invention deals with removing noble metals from mixtures with oxides of base metals.

BACKGROUND OF THE INVENTION

Automotive-type CO and NOx catalysts are guaranteed for at least 50,000 miles for OEM catalytic converters, and 25,000 miles for less expensive replacement converters. During this period of use, the catalyst is exposed to repeated high-low temperature cycling, sometimes reaching nearly 1,000° C., and, when misused, even exceeding the melting point of the ceramic base. Under the best conditions, over time the active surface area of the noble metal bearing washcoat coatings of such monoliths or pellets decreases significantly thereby causing a gradual loss of catalytic efficiency.

Several million spent catalytic converters are currently scrapped annually, each containing about one to two grams of platinum, palladium, and rhodium catalyst. Such mixtures, since the early 1980's, are typically in the ratio of Pt =1, Pd =0.4, and Rh =0.1. Prior to the early eighties only platinum, or platinum together with palladium was used. In view of the cost and relative scarcity of these noble metals, their recovery is a virtual necessity.

Commonly, the catalyst used for the emission control of automotive exhaust comprises a cordierite ceramic monolith of low surface area onto which has been deposited a high surface area washcoat of alumina and small amounts of other inorganic oxides. The alumina provides a high surface area substrate for the adsorption thereon of the catalytic noble metals. The small amounts of non-alumina base metal oxides in the washcoat act as stabilizers to surface area loss at high temperature and/or as catalytic promoters. Cordierite ceramic used for monoliths and pellets contains low surface area alumina, silica, and magnesia as its main constituents. The washcoat is usually between about 10 and 30 percent of the monolith by weight. Typically, the noble metal content of the coated monolith is 0.1 to 0.3 percent of the monolith by weight.

Though relatively few process details are published, a high temperature inductively-generated plasma melting process for catalyst monolith scrap at approximately 1,800° C. appears to be more economical than previous multi-step aqueous aqua regia leaching methods.

The plasma process is both capital- and energy-intensive. It relies on melting the entire catalyst to recover a small fraction of one percent of the catalyst mass.

The multiple steps of the aqueous leaching process are expensive complications which are compounded by the need for environmentally acceptable disposal of the large quantities of the acidic waste solutions generated. Rhodium (which is known to be refractory to aqueous aqua regia leaching) is the most difficult to recover, and in practice, only 50% is typically recovered from concentrates containing platinum and palladium even at a total noble metal concentration of up to 5 wt.%.

In yet another prior process, spent monolith scrap is added to commercial copper smelters. The noble metals end up in the copper, from which they are later separated. Only a limited amount of the monolith scrap can be added to the smelter at a given time, as excessive amounts can interfere with slag separation operations. There is considerable dissatisfaction with the commercial use of all of the above noble metal recovery methods.

Specifically with respect to the prior art, attention is directed to United States Patent 2,828,200 which describes the removal of noble metals from composites which involves the treatment thereof with gaseous aluminum trichloride at elevated temperatures and then recovering the gaseous products. More specifically an alumina-platinum catalyst may be reacted with aluminum trichloride formed by vaporization of aluminum trichloride crystals. In the article entitled "Recovering Platinum-Group Metals from Auto Catalysts" by James E. Hoffmann, Journal of Metals, June 1988, pages 40ff, a variety of leaching techniques are described for recovering the noble or precious metals from each catalyst.

Leaching techniques and other processes of types described above are mentioned in the review article entitled "Noble Metal Recovery From Spent Automotive Catalysts" by Michael J. D'Aniello, Jr., Society of Automotive Engineering Paper No 820187 (1981).

In an Abstract of German Patent Document 2,659,390 platinum recovery from spent catalyst uses fluorine treatment to form platinum fluoride which is then decomposed. The Abstract of Japanese Patent Document J5 0087-919 describes recovery of platinum from waste catalysts utilizing a dry gas containing carbon monoxide and chlorine in a single step process. A similar teaching is found in the Abstract of Japanese Patent Document J5 0087-920.

The Abstract of Belgian Patent 812 171 describes palladium recovery from spent catalysts by heating the catalyst with an organic chloride compound and then condensing the resulting vapor.

German Patent 2,415,069 describes the use of 9% $CCl_4$, in 91% air for the recovery of palladium only.

The Abstract of Japanese Patent Document J8 0044-139 which appears to be equivalent to Japanese Patent Document J5 0123 026 describes platinum group metal recovery from spent catalysts by treating in an atmosphere containing carbonyl chloride. The Abstract of Japanese Patent Document J8 0043-060 which appear to correspond to Japanese Patent Document J5 0123 025 describes palladium recovery from spent palladium catalysts by treatment with gas mixtures containing carbon monoxide and chlorine, again in a single stage.

The Abstract of Japanese Patent Document J5 0087-921 is similar in its use of chlorine and carbon monoxide. The Abstract of Japanese Patent Document J5 1123 723 describes the recover of platinum group metals from spent catalyst by incorporating aluminum therein and heating the product in a chlorine containing gas stream to recover the metal as the chlorides.

OBJECTS OF THE INVENTION

It is, therefore, an important object of the present invention to provide an improved process for noble metal recovery that avoids the many costly steps and inconveniences of the prior recovery techniques.

A further object is to provide a process which recovers the platinum and palladium separately from the rhodium in order to maximize the credit obtainable from a noble metal refiner for the two concentrates to be produced.

SUMMARY OF THE INVENTION

The term "noble metal content", as used in this specification, means not only one or more noble metals (i.e.: in the zero valence state) but includes also, for example, noble metals either partly or entirely present as oxide, or similarly in a higher valence state. Typically such conversion to oxides or surface oxides can occur during the use of the noble metals as oxidation catalysts.

The above objects are attained according to the invention in two-step method of recovering the noble metal content of a mixture of noble metals and a high surface area base metal oxide. This method begins with the reductive chlorination of the noble metal content under a strictly controlled time/temperature profile, chlorinating by means of a gaseous mixture of chlorine and a reducing agent. In the second stage we continue to chlorinate with chlorine alone (or other chlorinating atmospheres which will not chlorinate alumina) at an elevated temperature sufficient to volatilize the rhodium trichloride formed and collect the rhodium trichloride separately from the platinum and palladium chlorides which are the products of the first-stage reductive chlorination.

During the first stage, reductive chlorination is continued to complete the conversion of the platinum and palladium content to chloride vapor, and condensing the vapor together with any base metal chloride co-produced for later concentration of the noble metal content. The later concentration can be carried out by means of low temperature volatilization of the base metal chloride in a reducing atmosphere or some other suitable method.

The two-step method of the invention thus comprises the steps of:

(a) chlorinating the mixture with a chlorinating composition selected from the group which consists of chlorine admixed with a gaseous reducing agent, a gaseous reaction product of chlorine with the gaseous reducing agent, and mixtures thereof at a temperature and for a time sufficient to volatilize the base metal, and the majority of platinum and palladium from the mixture in the form of a chlorides thereof and produce a residue, and collecting the chlorides of the base metal, platinum and palladium; and (b) thereafter chlorinating the residue with chlorine alone (or other chlorinating atmospheres that cannot chlorinate alumina) at a temperature and for a time to convert the rhodium to rhodium trichloride, volatilizing the majority of rhodium trichloride and collecting rhodium trichloride vapor thus produced separately from collection of the platinum and palladium chlorides.

Advantageously, the mixture is a catalyst wherein the base metal oxide is a substantially high surface area alumina affixed to a support ceramic and the noble-metal component is an active deposit on the alumina and is present in an amount of at most about 5 % by weight of the mixture.

More particularly, the catalyst is a spent automotive catalytic converter catalyst comprising a cordierite monolith support having bonded thereto a coating of the base metal oxide carrying the noble-metal component in an amount such that platinum, palladium, and rhodium are present in an amount of 0.1 to 0.3 percent of the weight of the catalyst. The catalyst can also be a hydrocarbon reforming catalyst.

Preferably the temperature in step (a) is held between 350° and 650° C. In step (a), the reductant, if carbon monoxide, can be present in the composition in an amount of 1 to 90% by volume and preferably 30 to 50% by volume, the balance being chlorine. When sulfur dioxide is used as the reductant it may be present in an amount of 1 to 90% by volume, preferably 5 to 10% by volume, the balance being chlorine or inert gas as described below.

In step (b), the volatilization of rhodium chloride can be carried out in an atmosphere of chlorine alone.

Alternately, an atmosphere of chlorine and sulfur dioxide or chlorine and sulfuryl chloride or sulfuryl chloride alone can be used as none of these reagents attack either washcoat or cordierite.

As applied to an alumina-noble metal mixture forming a catalytic converter catalyst of an automotive vehicle, the invention recovers the bulk of the noble metals, supported on high surface area alumina, of a solid catalyst monolith or pellets, with alumina being the predominant constituent of the support and the noble metal content being generally less than on percent the weight of the support. The method comprises the steps of subjecting the alumina and the noble metals to first a reductive chlorination at moderately elevated temperatures, by means of chlorine admixed with a gaseous reducing agent, followed by chlorine alone in the second stage at much higher temperature.

The former set of conditions volatilizes platinum and palladium (and some minor portion of the rhodium), while the latter set of conditions volatilizes the bulk of the rhodium.

The resulting platinum and palladium chlorination products are then separated from the resulting aluminum trichloride vapor via sublimation at lower temperature. Because the aluminum trichloride sublimes at a lower temperature than the temperatures of vaporization of the noble metal chlorination products, reducing the temperature to a value below the latter, but above the sublimation point of aluminum trichloride, effectively separates the noble metal products from the aluminum trichloride vapor, which thus permits concentration of the platinum/palladium product of reaction.

A key element of the invention is to minimize the reaction of washcoat and cordierite such that minimal aluminum trichloride is formed consistent with good removal of the noble metals. Aluminum trichloride is known to form complexes with both platinum dichloride and palladium dichloride. These complexes, of the form $M_2Al_2Cl_8$ (where M is the noble metal), are known to have a much higher volatility than the corresponding noble metal chloride alone. However, only sufficient aluminum trichloride to effectively remove the noble metals should be formed because the aluminum trichloride is a diluent for the noble metals, and may, indeed, have to be removed at a later stage.

The method utilizes the large differences in volatility of aluminum trichloride, and the platinum and palladium bearing products of the first-stage reductive chlorination, so as to facilitate their concentration by later sublimation of the aluminum trichloride.

Because the complexes $M_2Al_2Cl_8$ are of increased volatility than the noble metal chlorides alone, it is advantageous to sublime aluminum trichloride in the presence of a reducing agent as carrier gas. A reducing agent such as hydrogen can convert these complexes, and the noble metal chlorides to nonvolatile metal.

One of the most important features of the invention is minimizing the reaction of the alumina-bearing washcoat while maximizing the volatility of the noble metals and simultaneously achieving no significant attack of the underlying cordierite ceramic. The production of alumina must be minimized in order to facilitate the concentration of the platinum and palladium chlorides. (The co-production of aluminum trichloride is minimized by the preferred conditions provided in this specification).

The noble metal chlorides can be converted to the metals as described in Gmelin's Handbuch der Anorganischen Chemie, Platinum, Vol. Al, pp. 8–15 (1975).

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 3:
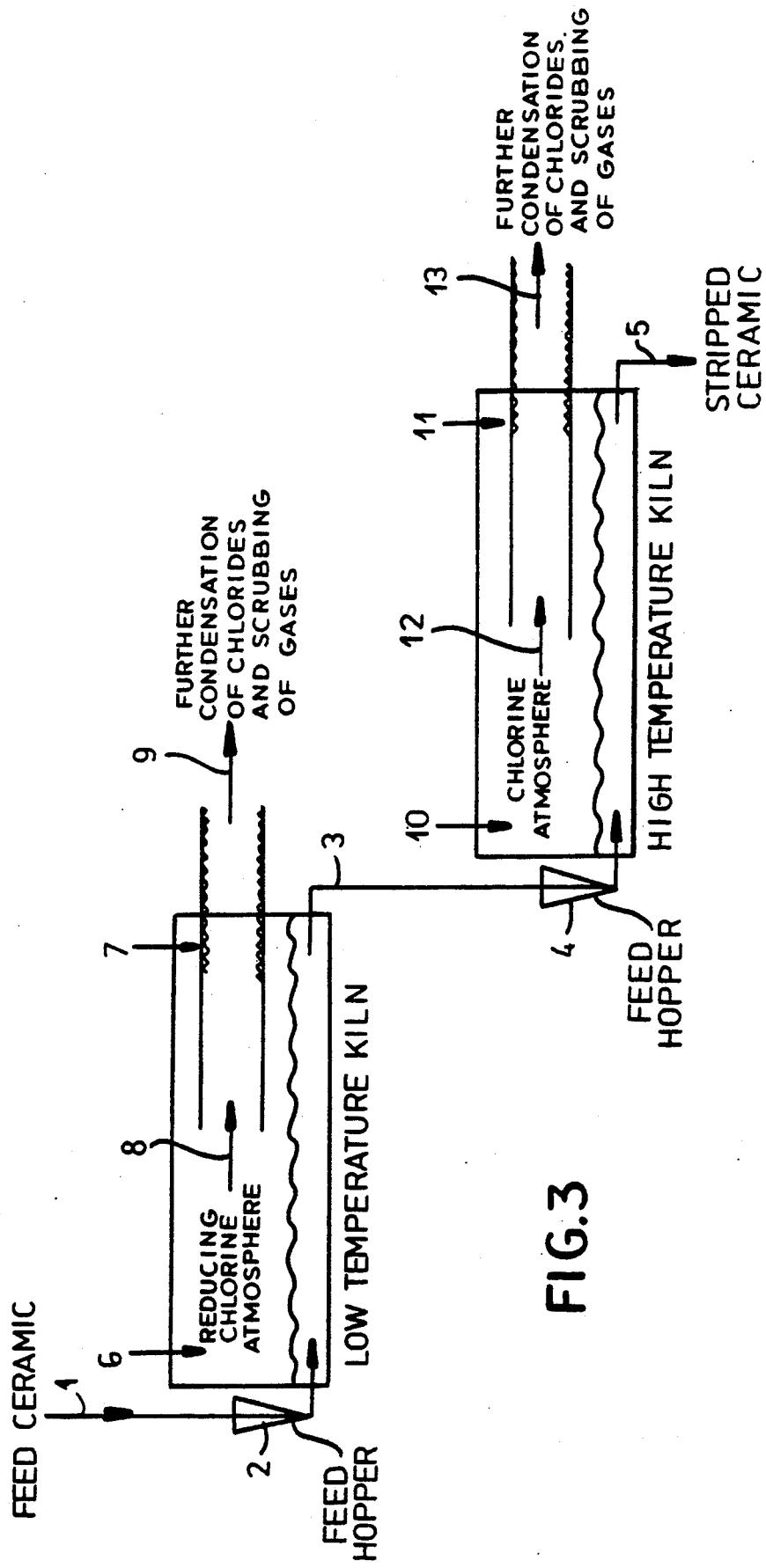
FIG. 3 is a diagram illustrating the use of rotating kilns in accordance with the invention.

Referring to FIG. 3 it can be seen that the method of the invention can be carried out in a continuous flow of spent catalyst which traverses two kilns of staged atmospheres and temperatures. A practical embodiment of the invention may be to operate the reactions in a quartz rotary tube furnace with gas and ceramic flows as described in FIG. 3. The required flow rate of ceramic to achieve a specific retention time is set by the rotation speed of the kiln and the angle of the kiln. Referring to FIG. 3, crushed or ground monolith materials enters the Stage I kiln at 1 through a hopper at 2, exits at 3, and enters the Stage II kiln through a hopper at 4, and exits the process at 5. A reducing chlorinating atmosphere is maintained in the Stage I, low temperature, kiln via feeds at 6 and 7. A chlorinating atmosphere non-reactive with alumina is maintained in the Stage II, high temperature, kiln via feeds at 10 and 11. Product gases are extracted via exhaust tubes from the hot zones of the Stage I and Stage II kilns at 8 and 12 respectively. Product material from Stage I (platinum and palladium chlorides and a minimum of aluminum trichloride) and Stage II (rhodium trichloride) is condensed within the exhaust tubes as they exit the furnace and the gases so extracted cool to lower temperatures. The gases flow from the exhaust tubes to further condensation and scrubbing at 9 and 11.

In order to increase the value of the first-stage platinum and palladium chloride concentrate that is produced to above ninety percent of the metallic state value, it is important that the platinum and palladium contents produced should be over 5 wt%. Thus, there may be a need for further concentration of the noble metal content. It has been found that a way to partially achieve this goal is to control the amount of reductant in the chlorinating reagent mixture. Thermodynamic analysis shows that carbon monoxide is capable of reducing the noble metal oxides as well as alumina. By contrast, sulfur dioxide is capable of reducing the noble metal oxides, but not the alumina. (Sulfuryl chloride behaves similarly as it decomposes at Stage I temperatures to sulfur dioxide and chlorine.) There is also the possibility that sulfur dioxide produces noble metal sulfides or other volatile sulfur-containing species. The exact composition of such species, if any, is, at present, unknown.

Tables 1 and 2 show the influence of carbon monoxide and sulfur dioxide composition respectively in conjunction with chlorine. These data were taken in a 3 cm diameter tube furnace at a combined reagent flow rate ofo 200 ml/min for reaction with spent automotive converter samples.

TABLE 1

| EFFECT OF CARBON MONOXIDE, 500° C. | | | | |
|---|---|---|---|---|
| COMPOSITION | % WASHCOAT | % REMOVAL OF | | |
| (% CO) | WEIGHT LOSS | Pt | Pd | Rh |
| 0 | 1.1 | 4.0 | 9.5 | no effect |
| 5 | 11.6 | 3.5 | 98.3 | " |
| 10 | 31.6 | 27.8 | 98.7 | " |
| 25 | 56.8 | 81.1 | 98.6 | " |
| 40 | 66.8 | 96.0 | 98.8 | " |
| 50 | 64.0 | 95.9 | 98.8 | 17.2 |

TABLE 2

| EFFECT OF SULFUR DIOXIDE, 550° C. | | | | |
|---|---|---|---|---|
| COMPOSITION | % WASHCOAT | % REMOVAL OF | | |
| (% SO2) | WEIGHT LOSS | Pt | Pd | Rh |
| 0 | 1.1 | 4.0 | 9.5 | no effect |
| 5 | slight gain | 73.6 | 92.5 | " |
| 10 | " | 71.7 | 94.9 | " |
| 25 | " | 72.3 | 87.8 | " |
| 40 | " | 73.9 | 89.5 | " |
| 50 | " | 76.2 | 89.1 | " |

As Tables 1 and 2 show, with chlorine alone no significant platinum removal can be expected at this temperature. It can be seen that sulfur dioxide has a significant effect even at very low concentrations. Up to 70% platinum removals can be achieved with only a 5% constituent of sulfur dioxide. This, to our knowledge is a new and very significant result previously unreported in the literature. Key also is that the rhodium content remains unaffected. We believe that rhodium trichloride is produced, but not volatilized at Stage I temperatures.

Table 3 illustrates the result of combining the reduction reagents together in an effort to minimize the reaction of washcoat to aluminum trichloride. In fact, poorer removal performance is observed.

TABLE 3

TERNARY COMPOSITIONS OF CHLORINE, CO, AND SO$_2$, 500° C.

| COMPOSITION | | | % WASHCOAT | % REMOVAL OF | | |
|---|---|---|---|---|---|---|
| Cl$_2$ | SO$_2$ | CO | WEIGHT LOSS | Pt | Pd | Rh |
| 90 | 5 | 5 | 3.1 | 36.0 | 61.9 | no effect |
| 85 | 5 | 10 | 13.0 | 41.3 | 98.5 | " |
| 75 | 5 | 20 | 31.7 | 60.7 | 98.2 | 3.0 |

Compositions with larger fractions of CO begin to produce significant amounts of elemental sulfur from the reaction of carbon monoxide with sulfur dioxide. This reaction must be taking place prior to any noble metal chemistry.

Thus, in one possible preferred embodiment, in which washcoat attack is limited to the extent possible consistent with greater than 90% platinum and palladium removals, sulfur dioxide is fed for only part of the reductive chlorination period, and carbon monoxide is fed for the remainder. The majority of the platinum and a clear majority of the palladium can be removed without the co-production of aluminum trichloride. The remainder of the platinum and palladium can then be removed by the harsher conditions of carbon monoxide reductive chlorination. Rhodium removal takes place as a second step at 1,000° C. in an atmosphere of chlorine.

Figure 1:
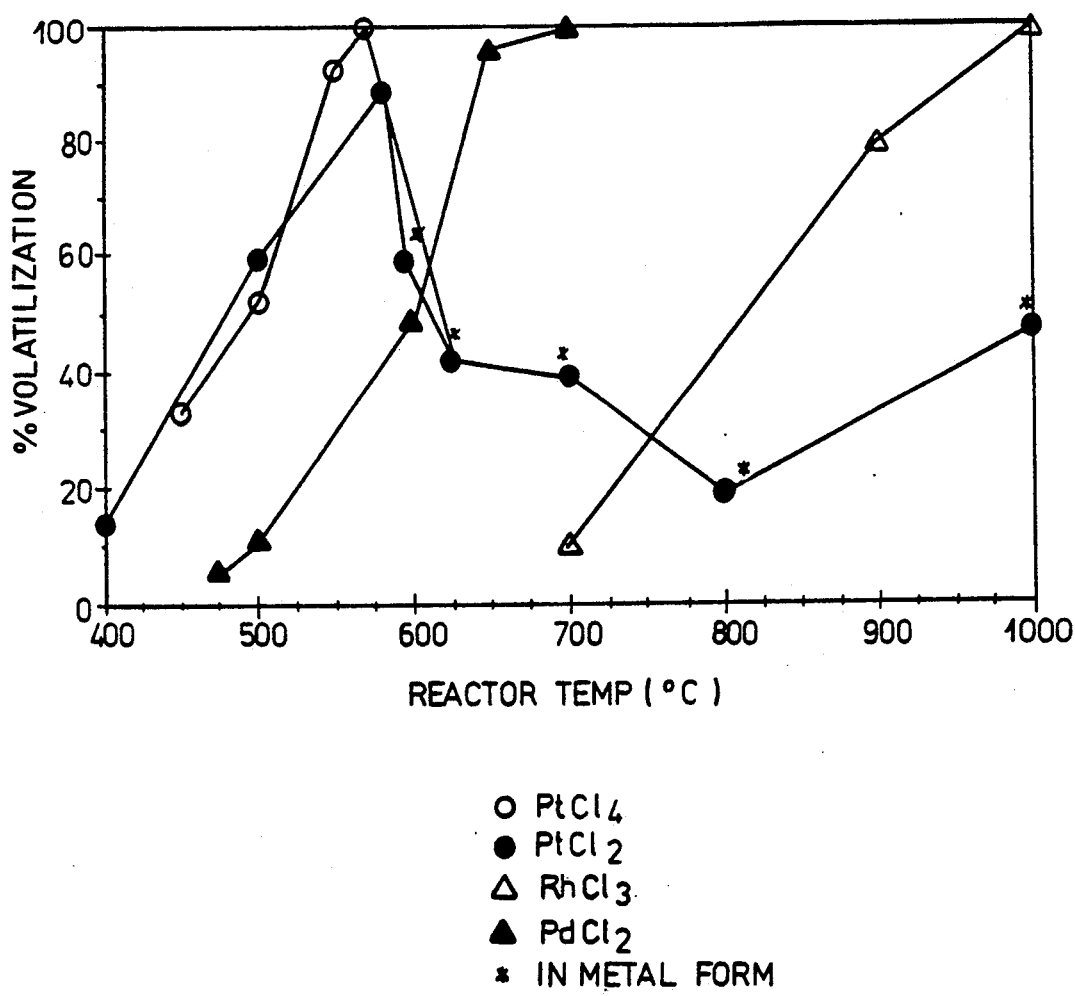
FIG. 1 is a graph showing the volatilization of platinum group metal chlorides in a chlorine atmosphere in which the volatilization is plotted along the ordinate against reactor temperature plotted along the abscissa.

One of the reasons for strict temperature control through the two stages of the process is the decomposition of noble metal chlorides back to metal and chlorine that can occur at temperatures above those at which chlorination begins. FIG. 1 shows the volatilization of platinum, palladium, and rhodium chlorides in chlorine alone as a function of temperature. It can be clearly seen that at approximately 580° C., the volatility of platinum reaches a peak, and then sharply declines due to the decomposition of the chloride to chlorine and metal. This sets a limit on the temperature of the first stage of the process. Most platinum must be recovered below 580° C., before temperatures are to be increased in order to volatilize the rhodium trichloride formed in stage one. Palladium recovery has not been an issue due to the higher volatility of palladium dichloride. Over 90% removals of palladium are achieved over a wide variety of conditions.

Figure 2:
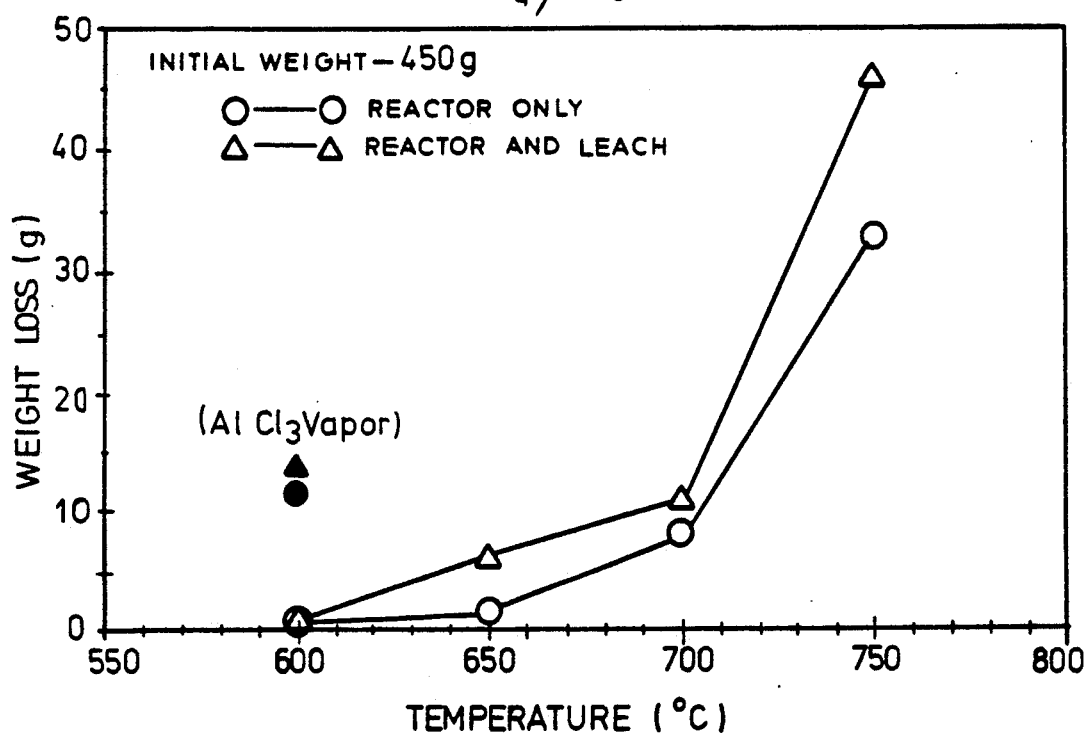
FIG. 2 is a graph illustrating the minimization of cordierite attack via results obtained in accordance with the invention.

FIG. 2 shows the attack of chlorinating reagent on cordierite alone. Very little reaction is observed at temperatures lower than 750° C. Thus, if reductant is only present under conditions of 450 to 550° C., consistent with the platinum chlorination data, a negligible attack on cordierite is expected. No attack can occur in an atmosphere of chlorine alone at the higher temperatures needed for rhodium trichloride volatilization. Sulfur dioxide and chlorine can be used together for the rhodium trichloride volatilization because, as in the case of chlorine alone, no attack on either washcoat alumina or cordierite can occur.

It is plausible to attribute the preferential chlorination of the "washcoat alumina" (vs. the "cordierite alumina") in the case of non-sulfur dioxide reductants to the higher surface area of the washcoat, even through substantial surface area loss has occurred in the case of a spent catalyst. It is also possible that the silica or magnesia constituent of the cordierite decreases the reactivity of its alumina towards chlorination. In any event, the gaseous chlorinating reagents appear to penetrate the porous washcoat readily with the volatile aluminum trichloride being removed as it is formed, thereby allowing rapid chlorination.

Whatever the reason, our first stage process of simultaneously reductively chlorinating the alumina-containing catalyst support and the noble metal deposited thereon, transporting the material produced in the gas phase to a point of condensation, and then later separating the aluminum trichloride by sublimation is surprisingly effective for the recovery and many-fold concentration of the platinum and palladium.

The temperature bounds set on the first stage of the process are determined by experimentation with actual used catalytic converter cores, rather that the volatilization of reagent grade chlorides, as in FIG. 1 above. The results using carbon monoxide and chlorine can be seen in Table 4.

TABLE 4

TEMPERATURE DEPENDENCE OF THE REMOVAL OF Pt and Pd
(Use of 50/50 carbon monoxide and chlorine at 200 ml/min in 1 inch diameter tube furnace.)

| TEMPERATURE °C. | % WASHCOAT WEIGHT LOSS | % REMOVAL OF | | |
|---|---|---|---|---|
| | | Pt | Pd | Rh |
| 350 | 12.1 | 73.3 | 95.9 | 2.1 |
| 400 | 33.7 | 90.3 | 97.8 | 5.4 |
| 450 | 55.4 | 95.6 | 98.6 | 9.3 |
| 500 | 64.0 | 95.9 | 98.8 | 17.2 |
| 550 | 65.4 | 95.6 | 98.7 | 11.8 |
| 600 | 74.6 | 88.8 | 98.4 | 23.9 |
| 650 | 79.6 | 91.6 | 98.2 | 12.4 |

A number of gaseous reducing agents are suitable for the purposes of the present invention, including carbon monoxide, phosgene, and carbon tetrachloride (the latter two are also capable of providing the chlorine necessary for chlorination). Carbon tetrachloride, though effective as a reductive chlorination agent, poses difficult handling and environmental problems, as it absorbs into both the noble metal and spent ceramic products produced, and proves extremely difficult to separate by volatilization. In the United States, Environmental Protection Agency regulations state that anything with a content of over 0.5 wt.% carbon tetrachloride must be disposed of by incineration. Its us is to be phased out U.S. by 1995. Sulfur dioxide is a particularly useful reducing agent, as is sulfuryl chloride, which decomposes to sulfur dioxide and chlorine above approximately 300° C.

Three embodiments of the invention are given in the following examples, illustrating the two-stage removals for the use of carbon monoxide and chlorine, sulfur dioxide and chlorine, and carbon tetrachloride and chlorine.

In each example a spent cordierite-based automotive catalyst monolith having a so-called three-way catalyst compositions of platinum, palladium, and rhodium was broken into chunks of approximately one cubic inch in size. Approximately 0.5 kg of these chunks were then placed in a 11 cm diameter tube furnace and subjected to the following conditions.

CARBON MONOXIDE AND CHLORINE

Temperature is increased to 500° C. under an atmosphere of 40% carbon monoxide and 60% chlorine. Over the course of two hours under these conditions platinum and palladium are volatilized as their chlorides during which time approximately 40% of the washcoat is volatilized as aluminum trichloride. The furnace atmosphere is then changed to chlorine alone, whereupon further reaction of alumina to aluminum trichloride is terminated. Temperature is then increased to 1,000° C. for two hours, during which time the rhodium content is volatilized. Under these conditions, removals of all noble metals from the monolith chunks averages approximately 95% of the original content, as shown in Table 5.

TABLE 5

TWO-STAGE REMOVAL OF Pt, Pd and Rh
11 cm Vertical Reactor, Used Converter Material
Flow rate of reagent 1,000 ml/min

| TRIAL NUMBER | % WASHCOAT WEIGHT LOSS | % REMOVAL OF | | |
|---|---|---|---|---|
| | | Pt | Pd | Rh |
| 1 | 37.3 | 96.9 | 98.9 | 94.5 |
| 2 | 36.2 | 96.1 | 98.9 | 93.8 |
| 3 | 42.4 | 95.2 | — | 96.7 |

The product material containing platinum, palladium, and aluminum trichloride must be treated to further concentrate the noble metals. This is done by volatilizing the aluminum trichloride in a hydrogen atmosphere. At the 150 to 200° C. temperature of volatilization, hydrogen reduces the noble metal chlorides to the metals themselves. Table 6 shows that noble metals lost during the volatilization of aluminum trichloride can be minimized with the use of a gaseous reducing agent. Carbon monoxide and sulfur dioxide are expected to work equally well as hydrogen. The final concentration of noble metals obtained is of the order of 1wt. %.

TABLE 6

Concentration of PGM's via AlCl$_3$ Volatilization

| Temperature °C. | Time hrs | Carrier gas | Wt. % Volatilized from feed | PGM's Lost with AlCl$_3$ |
|---|---|---|---|---|
| 180 | 5 | Ar | 48.1 | 21.1 |
| 180 | 7 | Ar | 58.4 | 13.3 |
| 170 | 3 | H$_2$ | 50.5 | 0.7 |
| 180 | 3 | H$_2$ | 47.0 | 0.9 |
| 200 | 3 | H$_2$ | 45.0 | 1.3 |

SULFUR DIOXIDE AND CHLORINE

Temperature is increased to 550° C. under an atmosphere of 10% sulfur dioxide and 90% chlorine. Over the course of two hours under these conditions platinum and palladium are volatilized as their chlorides during which time approximately 7% loss of weight of the washcoat is observed. (This weight loss is not reaction to aluminum trichloride, but may reflect volatilization of minor constituents of the washcoat.) The furnace atmosphere is then changed to chlorine alone, however, as no further washcoat attack is observed, this is not strictly necessary. Temperature is then increased to 1,000° C. for two hours, during which time rhodium content is volatilized. Under these conditions, removals of all noble metals from the monolith chunks averages approximately 80% of the original content, as shown in Table 7.

TABLE 7

Two-Stage Removals of Pt, Pd, and Rh Using Chlorine and SO$_2$
11 cm Vertical Furnace, Used Converter Material

| TRIAL NUMBER | % WASHCOAT WEIGHT LOSS | % REMOVAL | | |
|---|---|---|---|---|
| | | Pt | Pd | Rh |
| 1 | 6.2 | 72.4 | 82.4 | 94.4 |
| 2 | 5.4 | 71.8 | 81.1 | 94.8 |
| 3 | 7.8 | 85.3 | 84.1 | 91.6 |
| 4 | 8.6 | 87.8 | 91.1 | 93.6 |

TABLE 7-continued

Two-Stage Removals of Pt, Pd, and Rh Using Chlorine and SO$_2$
11 cm Vertical Furnace, Used Converter Material

| TRIAL NUMBER | % WASHCOAT WEIGHT LOSS | % REMOVAL | | |
|---|---|---|---|---|
| | | Pt | Pd | Rh |
| 5 | 8.3 | 76.3 | 85.5 | 93.5 |
| 6 | 6.9 | 92.4 | 99.0 | 96.6 |
| 7 | 5.7 | 93.9 | 97.7 | 96.4 |

Trials 1 and 2 used 90% chlorine and 10% sulfur dioxide for Stage I and chlorine alone for Stage II. Trials 3, 4, and 5 used the Stage I gas composition for Stage II. Trials 6 and 7 used the Stage I gas composition for Stage II and converters that were crudely crushed and ground to expose additional surface area.

Grinding the monolith material fine enough to expose more of the noble metals within the washcoat improves removals. The removals from monolith chunks using reagents that react with and remove alumina do not need to be improved by such crushing and/or grinding.

The concentration of noble metals in the products from sulfur dioxide and chlorine treatment averaged approximately 5 wt.%.

CARBON TETRACHLORIDE AND CHLORINE

Temperature is increased to 550° C. under an atmosphere of carbon tetrachloride. Over the course of 2.5 hours under these conditions platinum and palladium are volatilized as their chlorides during which time approximately 50% of the washcoat is reacted to aluminum trichloride. The furnace atmosphere is then changed to chlorine alone, whereupon further reaction of alumina to aluminum trichloride is terminated. Temperature is then increased to 1,000° C. for two hours, during which time the rhodium content is volatilized. Under these conditions, removals of all noble metals from the used monolith chunks averages approximately 95% of the original content, as shown in Table 8.

TABLE 8

Two-Stage Removals of Pt, Pd, and Rh
11 cm Vertical Furnace, Used Converter Material

| TRIAL NUMBER | % WASHCOAT WEIGHT LOSS | % REMOVAL OF | | |
|---|---|---|---|---|
| | | Pt | Pd | Rh |
| 1 | 104 | 96.9 | 91.6 | 96.7 |
| 2 | 71.8 | 96.0 | 98.7 | 87.8 |
| 3 | 86.9 | 89.2 | 76.6 | 98.5 |

The concentration of the noble metals in the product averaged approximately 0.5 wt.%.

A practical embodiment of the invention of the preferred conditions of the invention may be to operate the above reactions in a quartz rotary tube furnace with gas and ceramic flows a described in FIG. 3. The required flow rate of ceramic to achieve a specific retention time is set by the rotation speed of the kiln and the angle of the kiln. Referring to FIG. 3, crushed or ground monolith materials enters the Stage I kiln at ! through a hopper at 4, and exits the process at 5. A reducing chlorinating atmosphere is maintained in the Stage I, low temperature, kiln via feeds at 6 and 7. A chlorinating atmosphere non-reactive with alumina is maintained in the Stage II, high temperature, kiln via feeds at 10 and 11. Product gases are extracted via exhaust tubes from the hot zones of the Stage I and Stage II kilns at 8 and 12 respectively. Product material from Stage I and Stage II is condensed as the exhaust tubes exit the furnace and the gases extracted cool to lower temperatures. The gases flow from the exhaust tubes to further condensation and scrubbing at 9 and 11. The exhaust tubes may be designed to be removed periodically for collection of products. They may be fabricated from quartz.

We claim:

1. A two-step method of recovering a noble metal content from a mixture containing a noble metal component including rhodium, platinum, and palladium, and a high surface area base metal oxide whose metal forms a chloride vaporizing at a lower temperature than chloride of said noble metal component, said method comprising the steps of:
   (a) chlorinating said mixture with a chlorinating composition selected from the group which consists of chlorine admixed with a gaseous reducing agent, a gaseous reaction product of chlorine with said gaseous reducing agent, and mixtures thereof at a temperature and for a time sufficient to volatilize the base metal, platinum, and palladium from said mixture in the form of chlorides thereof and produce a residue, and collecting said chlorides of said base metal, platinum and palladium; and
   (b) thereafter chlorinating said residue with chlorine alone or with a chlorinating agent which does not chlorinate alumina at a temperature and for a time to convert said rhodium to rhodium trichloride volatilizing said rhodium trichloride, and collecting the rhodium trichloride vapor thus produced separately from collection of said platinum and palladium chlorides.

2. The method defined in claim 1 wherein said mixture is a catalyst wherein said base metal oxide is a substantially high surface area alumina affixed to a support ceramic and said noble metal component is an active deposit on said alumina and is present in an amount of at most about 5 % by weight of said mixture.

3. The method defined in claim 2 wherein said support is in the form of pellets, or material crushed or ground from same.

4. The method defined in claim 2 wherein said support is a honeycomb monolith, or material crushed or ground from same.

5. The method defined in claim 4 wherein said catalyst is a spent automotive catalytic converter catalyst comprising a cordierite monolith support having bonded thereto a coating of the base metal oxide carrying said noble metal component in an amount such that platinum, palladium, and rhodium are present in an amount of 0.1 to 0.3 percent of the weight of the catalyst.

6. The method defined in claim 2 wherein said catalyst is a hydrocarbon reforming catalyst.

7. The method defined in claim 1 wherein said base metal oxide is alumina and aluminum trichloride is formed in step (a) in a chloride mixture collected in step (a), said method further comprising the step of at least partially removing aluminum trichloride from said chloride mixture either by sublimation alone to form a concentrate of platinum and palladium chlorides, or by sublimation in the presence of a reducing agent selected from the group which consists of hydrogen, carbon monoxide or sulfur dioxide.

8. The method defined in claim 1 wherein said gaseous reducing agent is selected from the group which consists of carbon monoxide, phosgene, carbon tetrachloride, sulfur dioxide, sulfuryl chloride and mixtures thereof.

9. The method defined in claim 1 wherein said temperature in step (a) is 350° C. to 650° C.

10. The method defined in claim 1 wherein, in step (b) volatilization of rhodium trichloride is carried out in either an atmosphere of chlorine alone or an atmosphere of chlorine and sulfur dioxide, or an atmosphere of chlorine and sulfuryl chloride or sulfuryl chloride alone.

11. The method defined in claim 1 wherein said temperature in step (b) is 850° to 1,100° C.

12. The method defined in claim 1 wherein steps (a) and (b) are carried out in succession in either a common kiln or separate kilns where said mobile metal component - base metal oxide mixture flows from one to another.

13. The method defined in claim 12 wherein said rhodium trichloride is collected in step (b) by condensing the rhodium trichloride in exhaust pipes or on heat sinks in said kiln.

14. The method defined in claim 1 wherein said chlorinating composition includes an inert carrier gas selected from the group which consists of argon and carbon dioxide.

15. The method defined in claim 1 wherein, in step (b) the chlorine is admixed with an inert carrier gas selected from the group which consists of argon and carbon dioxide.

16. The method defined in claim 2 wherein said catalyst is fed continuously along a path, is contacted by said chlorinating composition in counterflow along an upstream portion of said path and is contacted in step (b) by chlorine in counterflow along a downstream portion of said path either in a common or separate kilns.

17. The method defined in claim 16 wherein said chlorinating composition is supplied to said path at a low temperature portion of the path.

18. The method defined in claim 1 wherein:
   said chlorinating composition in step (a) includes an inert carrier gas selected from the group which consists of argon and carbon dioxide;
   in step (b) the chlorine is admixed with an inert carrier gas selected from the group which consists of argon and carbon dioxide;
   said mixture is a catalyst wherein said base metal oxide is a substantially high surface area alumina affixed to a support ceramic and said noble metal component is an active deposit on said alumina and is present in an amount of at most 5 % by weight of said mixture;
   said temperature in step (a) is 350° C. to 650° C.;
   said temperature in step (b) is 850° to 1,100° C.;
   steps (a) and (b) are carried out in succession in a common kiln; and
   said gaseous reducing agent is selected from the group which consists of carbon monoxide, phosgene, carbon tetrachloride, sulfur dioxide, sulfuryl chloride and mixtures thereof.

* * * * *